US012781029B2

(12) United States Patent
Weber

(10) Patent No.: US 12,781,029 B2
(45) Date of Patent: Nov. 3, 2026

(54) BLENDS OF VIRGIN LDPE AND POST CONSUMER RECYCLATE LOW AND/OR LINEAR LOW DENSITY POLYETHYLENE AND METHODS THEREOF

(71) Applicant: EQUISTAR CHEMICALS, LP, Houston, TX (US)

(72) Inventor: Robert Scott Weber, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 573 days.

(21) Appl. No.: 18/243,352

(22) Filed: Sep. 7, 2023

(65) Prior Publication Data

US 2024/0084115 A1 Mar. 14, 2024

Related U.S. Application Data

(60) Provisional application No. 63/404,820, filed on Sep. 8, 2022.

(51) Int. Cl.
*C08L 23/06* (2006.01)

(52) U.S. Cl.
CPC ........... *C08L 23/06* (2013.01); *C08L 2203/16* (2013.01); *C08L 2205/025* (2013.01); *C08L 2207/066* (2013.01); *C08L 2207/20* (2013.01)

(58) Field of Classification Search
CPC ................. C08L 23/06; C08L 2203/16; C08L 2205/025; C08L 2207/06
See application file for complete search history.

(56) References Cited

U.S. PATENT DOCUMENTS

| | | | |
|---|---|---|---|
| 7,393,916 B2 | 7/2008 | Neubauer et al. | |
| 10,124,527 B2 | 11/2018 | Li | |
| 10,138,310 B2 | 11/2018 | Mavridis et al. | |
| 2013/0015604 A1 | 1/2013 | Hallaji | |
| 2022/0227977 A1 * | 7/2022 | Kleczek | C08L 23/06 |
| 2022/0281150 A1 * | 9/2022 | Carbonell | B29C 48/022 |

FOREIGN PATENT DOCUMENTS

| | | |
|---|---|---|
| CA | 3157619 A1 | 5/2021 |
| EP | 1216824 A1 | 6/2002 |
| EP | 3800284 A1 | 4/2021 |
| JP | 2020199674 A | 12/2020 |
| WO | 2020009932 A1 | 1/2020 |

OTHER PUBLICATIONS

Curtzwiler et al., Mixed Post-Consumer Recycled Polyolefins as a Property Tuning Material for Virgin Polypropylene, Journal of Cleaner Production, (2019)239:117978, doi.org/10.1016/j.jclepro.2019.117978.

Albareeki et al, Compounding of Polyethylene Composites Using High Speed Twin and Quad Screw Extruders, AIP Conf. Proc 2139 (2019), 020006. doi.org/10.1063/1.5121653 <https://doi.org/10.1063/1.5121653>.

The International Search Report and The Written Opinion for PCT/US2023/032172 mailed Nov. 28, 2023.

* cited by examiner

*Primary Examiner* — Gregory Listvoyb

(57) ABSTRACT

Compounded virgin low density polyethylene (virgin LDPE) and post-consumer recyclate low density polyethylene, linear low density polyethylene or a combination of low and linear low density polyethylene compositions with improved processability and mechanical properties, including processes of making, products and application in food and non-food packaging are described herein.

11 Claims, 1 Drawing Sheet

BLENDS OF VIRGIN LDPE AND POST CONSUMER RECYCLATE LOW AND/OR LINEAR LOW DENSITY POLYETHYLENE AND METHODS THEREOF

PRIOR RELATED APPLICATIONS

This application claims the benefit of priority to U.S. Provisional Application No. 63/404,820, filed on Sep. 8, 2022, which is incorporated herein by reference in its entirety.

FEDERALLY SPONSORED RESEARCH STATEMENT

Not applicable.

FIELD OF THE DISCLOSURE

The disclosure generally relates to blends of virgin low, linear low and high density polyethylene and post-consumer recycled ("PCR") low density polyethylene, linear low density polyethylene, or combinations thereof, with improved processability and properties, including processes of making, and products and applications thereof.

BACKGROUND OF THE DISCLOSURE

Low density polyethylene ("LDPE") is a thermoplastic polymer made from petroleum. The density may range from about 0.91 to about 0.95 g/cm$^3$, which is "low" compared to other polyethylenes. These low density polymers are noted for their low temperature flexibility, toughness, and corrosion resistance, plus it is meltable and moldable. Furthermore, LDPE can be manufactured in such a way that it is consider food safe and can be used in food packaging and storage, although not all LDPE is food safe.

"Virgin" plastic is plastic that originates from feedstock that has never been used by a consumer—that is, non-recycled material. Because of its strength and nontoxicity, virgin LDPE is used in a variety of applications requiring flexibility and toughness, including flexible snack food packaging, paper board coating for cups, and packaging, sugar pouches, industrial overwraps, grocery/garbage bags, produce bags, squeeze bottles and containers, cling wrap, six-pack soda rings, etc.

Recycled LDPE, including linear LDPE ("LLDPE") may be used in applications similar to virgin LDPE, including use in piping, rubbish bags, bubble wrap, sheeting and films, etc. However, reusable packaged products produced by recycled LDPE do not always meet the USDA requirements for direct contact with drug and/or food products made for human consumption.

In order to reduce plastic manufacturing and disposal, efforts have been ongoing to recycle plastics, but recycling processes often degrade the polymers. Thus, there have also been efforts to blend virgin and recycled plastics to provide higher quality materials. Unfortunately, blending polymers with different properties may also introduce additional variables into the finished product that may be undesirable or may produce a product of inferior quality. Thus, there is a need in the art to provide better methodology and products that combine virgin and recycled plastics.

Provided in this disclosure are methods of blending virgin LDPE and PCR LDPE, including linear LDPE ("LLDPE"), to make plastics that retain or improve the properties of either virgin or post-consumer recyclate plastic for the intended end use, and may be usable in food and beverage industry.

SUMMARY OF THE DISCLOSURE

This disclosure provides compounded LDPE polymers containing a high melt index virgin LDPE with lower melt index (MI) recycled LDPE or LLDPE polymers, or combinations of recycled LDPE and LLDPE. The resulting blends, also called compounded polymers, have melt indexes of 3.0-20 g/10 min wherein melt index is measured at 190 °C under 2.16 kg force, a density of about 0.91-0.93 g/cm$^3$ or 0.915-0.928 g/cm$^3$, and have both good processing capability, as well as good characteristics for cast film, extrusion coating or extrusion lamination applications. In some embodiments, the virgin LDPE may also include small amounts of high density PE ("HDPE") (virgin and/or recycled) to increase stiffness of the compound plastics for e.g. improved scuff resistance on the final product.

DETAILED DESCRIPTION

Figure 1A:
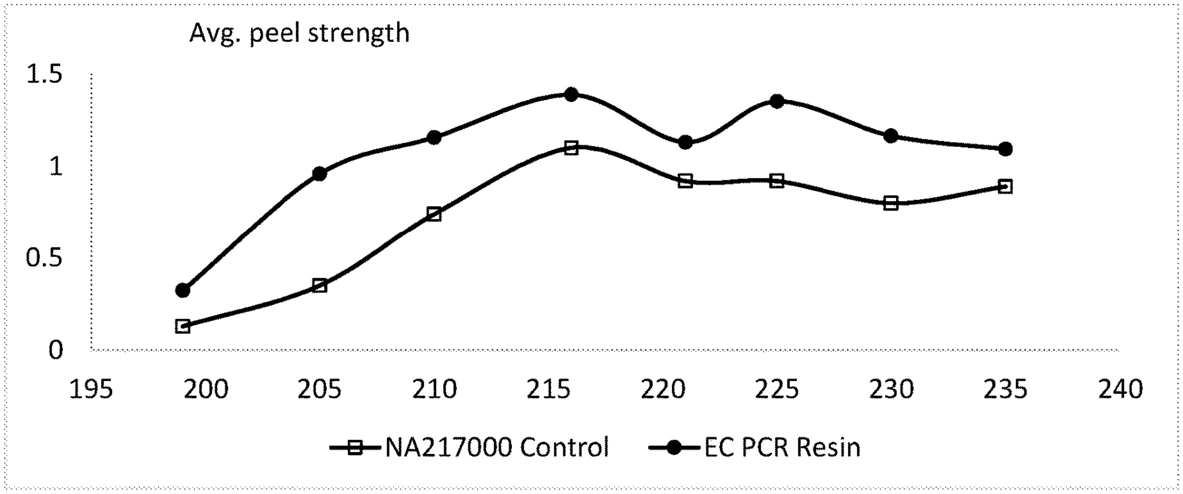
FIG. 1A. displays the average peel strength for an exemplary formulation of the presently disclosed compound polymer and FIG. 1B displays the max peel strength for the same formulations.

The present disclosure relates to processing or mixing of a virgin plastic with post-consumer recyclate plastic in processing plants to provide a compounded plastic. The plastics, having been previously and independently extruded and pelletized, may be fed independently or in combination into an extruder. In the extruder, the plastics may be melted and mixed, and then extruded and pelletized for subsequent applications, particularly in cast film, extrusion coating or extrusion lamination layer.

In one embodiment, the plastics (virgin LDPE and PCR LDPE and/or LLDPE) may be mixed in an extruder using a single screw extruder. Testing the single screw blending method, indicated that it may be less preferred where high quality films are needed. Compositions made in single-screw extrusion may have significant gels in the resulting films. This may be acceptable for certain applications, but for high quality films, a higher shear compounding method is preferred.

In another embodiment, a co-rotating twin screw extruder or any other high shear method may be used to mix or otherwise compound the virgin and recycled polymers. In one embodiment of a twin-screw compounding extruder, two intermeshing, co-rotating screws mounted on splined shafts in a closed barrel are used. The compounded plastics of the present disclosure may be more homogeneously mixed in a twin screw extruder as compared to a single screw extruder, but any sufficiently high shear method could be used, such as continuous mixers, Banbury mixers, and the like. In one embodiment, the virgin LDPE and the PCR LDPE and/or LLPDE are melt compounded with a specific mechanical energy greater than about 0.15 kW/kg/hr; alternatively, from 0.15 kW/kg/hr to 0.5 kW/kg/hr; and alternatively, from 0.20 kW/kg/hr to 0.4 kW/kg/hr.

Further details on co-rotating twin-screw extruders for compounding LDPE may be found in James L. White and Eung K. Kim in Twin Screw Extrusion: Technology and Principles (2$^{nd}$ Ed.) Carl Hanser Verlag, Munich 2010;

Klemens Kohlgruber and Werner Wiedmann, in Co-rotating Twin-Screw Extruders: Fundamentals, Technology, and Applications, Hanser, Munich 2008; Chan I. Chung in Extrusion of Polymers: Theory and Practice, Carl Hanser Verlag, Munich 2000; and Paul Anderson in Mixing and Compounding of Polymers ($2^{nd}$ Ed), Ed. Manas-Zloczower, Tadmore 2009, Chapter 25, p. 947, the contents of which are each hereby incorporated by reference in their entireties for all purposes.

For preparation of extrusion coated or extrusion laminated plastic films, foils, paper and paper board, scrim, woven and non-woven substrates for the food and non-food packaging industry, cast film, extrusion coating and extrusion lamination and the like may be used. In one embodiment of a cast film, extrusion coating and extrusion lamination process, plastic in the form of small beads or pellets may be fed through a feed throat to a barrel (or multiple barrels) that contains a rotating screw attached that forces the plastic pellets forward to a heated barrel. At a desired extrusion temperature set by the process and the type of desired plastic output, molten plastic may be formed by going through a combining adaptor where a feed block can form various layers which then passes through and leaves the slot, key-hole type (gapped at 0.015 to 0.075) extrusion die as a film. The film is dropped onto a moving web (one for extrusion coating and two for extrusion laminating) and is adhered to the substrates using pressure of the nip and chill roll to push the compounded polymer onto the substrate. The substrate can be treated using various pre-treatment methods such as corona, plasma, primer, ozone and flame. The finished product is wound up on a winder, which then proceeds to the next converting step. Film thickness can range from 0.2 mils (~0.005 mm) to 50 mils (~1.27 mm).

In more detail, a virgin LDPE with a high melt index is combined with a suitable post-consumer recyclate LDPE and/or LLDPE with a lower melt index to produce a blend with intermediate MI, a density of about 0.915-0.928 g/cm$^3$, and improved processability. This is achieved by high shear melt mixing of the virgin LDPE and PCR LDPE and/or LLDPE in, for example, a twin-screw compounding extruder, also called "single pellet" solution. The blend can be used in cast film, extrusion coating, or extrusion lamination layers, including multi-layer structures, to balance overall PCR content in the plastic, moisture barrier, material cost and film gauge.

The virgin LDPE of the present disclosure may have a melt index of greater than 2 g/10 min. In an alternative embodiment, it has a MI of 2-18, or more preferably 2-10 or 2-8 g/10 min. By contrast, the recycled LDPE and/or LLDPE will have a lower MI, for example, 0.50-1.5, or about 0.5-0.85 or about 0.75-1.25 or about 1.0-1.5 g/10 min. The compounded plastic will typically have an intermediate level of MI, depending on the ratios of the two plastics used. In general, the ratio of the two components is selected to target a final blend MI of from 3 to 20 g/10 min, alternatively from 3 to 11 g/10 min, alternatively from 8 to 20 g/10 min or about 9 to 15 g/10 min.

The virgin LDPE starting material may have a density between 0.915 to about 0.932 g/cm$^3$. In an alternative embodiment the virgin LDPE starting materials of the present disclosure may have a density ranging from about 0.920 to 0.925 g/cm$^3$.

The recycled LDPE and/or LLDPE starting materials, including combinations thereof, may have a density between 0.915 to about 0.932 g/cm$^3$. In an alternative embodiment the recycled LDPE and/or LLDPE starting materials of the present disclosure may have a density ranging from about 0.920 to 0.925 g/cm$^3$. The compounded polymer may have a similar density, or intermediate to the starting materials if they have different densities.

In one embodiment, the compounded polymers may have at least 15 wt. % recycled LDPE, LLDPE, or combinations thereof, preferably at least 20, 25, 30, 35, or about 40 wt. % recycled LDPE, LLDPE, or combinations thereof. Higher amounts are possible up to about 85 wt. %, but the cost of PCR LDPE, LLDPE, or combinations thereof is currently about 10% higher than virgin LDPE and thus 30-40 wt. %, or 35 wt. % may be preferred.

The compounded blend can therefore be used in multi-layer film structures to balance overall PCR content in the plastic, material cost and film gauge. Compounding virgin and PCR of different melt index can provide a plastic film that can be processed at higher extruder output as compared to virgin LDPE.

The compounded plastic and sheets or films made therefrom can be used in any product typically made with LDPE, include for example, snack food packaging, paper cups, commercial paper drink cups, ice cream containers, sugar packaging, house wrap, tarps, signage, metalized packaging, coffee packaging, dog food bags and the like.

In other embodiments, the compounded plastic can be used in cast film, extrusion coating and extrusion laminates. For extrusion coating evaluation were completed to evaluate the compounded PCR resins for processability as compared to standard extrusion coating grades. Samples were evaluated for processability where we achieved similar process parameters to standard extrusion coating resin grade with the PCR compounded resin. Process condition for processability were: melt temp 623 °F, 1000 fpm, achieved 0.3 mil coating weight and a neck-in of 3.75 inches total. These are standard parameters for extrusion coating grades that we reached with our PCR compounded resin.

The present disclosure includes any one or more of the following embodiments, in any combination(s) thereof:

A compounded polymer having a) 15-85 weight % of a virgin low density polyethylene (virgin LDPE) having a melt index of about 2.0-18.0 g/10 min; b) 15-85 weight % of a post-consumer recyclate low density polyethylene, linear low density polyethylene or a combination of low and linear low density polyethylene (PCR) having a melt index of about 0.5 to about 1.5 g/10 min, a density of about 0.915 to about 0.932 g/cc; c) wherein the compounded polymer has a melt index of about 3.0-20 g/10 min and a density of about 0.915-0.923 g/cm$^3$; and d) wherein melt index is measured at 190 °C under 2.16 kg force.

Any compounded polymer herein described, wherein the compounded polymer is mixed using specific mechanical energy greater than 0.10 kW/kg/hr at a temperature over 125 °C Preferably, the compounded polymer is mixed using a twin-screw compounding extruder at a temperature of 125-299 °C, or 150-220 °C.

Any compounded polymer herein described, wherein the virgin LDPE has a density of about 0.915-0.932 g/cm$^3$, and the PCR LDPE and/or LLDPE has a density of about 0.915-0.932 g/cm$^3$.

Any compounded polymer herein described, wherein the compounded polymer has a density of about 0.924 g/cm$^3$.

Any compounded polymer herein described, wherein the ratio of virgin LDPE to PCR LDPE and/or LLDPE is about 60/40, 70/30, or 65/35.

Any compounded polymer herein described, wherein the virgin LDPE and the PCR LDPE and/or LLDPE are food safe and/or the resulting compounded polymer is food safe.

Any compounded polymer herein described, said compounded polymer comprising 60-70 weight % of a virgin LDPE having a melt index of about 10 g/10 min; 30-40 weight % of a PCR LDPE and/or PCR LLDPE having a melt index of about 0.5-1.5 g/10 min; and wherein said compounded polymer has a melt index of about 7 g/10 min and a density of about 0.920-0.930 g/cm$^3$ or 0.924 g/cm$^3$.

Any compounded polymer herein described, said compounded polymer comprising: 60-70 weight % of a virgin LDPE having a melt index of about 10 g/10 min; 30-40 weight % of a PCR LDPE and/or LLDPE having a melt index of about 0.5-1.5 g/10 min; and wherein said compounded polymer is food safe and has a melt index of about 7 and a density of about 0.920-0.930 g/cm$^3$ or 0.924 g/cm$^3$ g/cm$^3$.

A polymeric film, coating, or lamination layer made from any compounded polymer herein described. Preferably, the film, coating, or lamination layer has 90% fewer gels than a similar polymer compounded with a single screw extruder. Preferably the cast film, extrusion coating, or extrusion lamination layer has a defect count less than 150 defects per meter$^2$ for a defect size between 500 µm and 7500 µm, or a defect count less than 15 defects per meter$^2$ for a defect size between 750 µm and 1000 µm, or a defect count less than 1.5 defects per meter$^2$ for a defect size between 1000 µm and 1250 µm, or a defect count less than 1.5 defects per meter$^2$ for a defect size of at least 1250 µm.

A polymeric film, coating, or lamination layer comprising any compounded polymer herein described and having a thickness less than 10 pounds of polymer/ream at a line speed greater than 1,000 feet/minute; and/or a draw down is less than 8 pounds/ream at a line speed greater than 1,000 feet/minute; and/or a draw down is less than 5 pounds/ream at a line speed greater than 1,000 feet/minute.

A polymeric film, coating, or lamination layer comprising one or more layers of any compounded polymer herein described and having a neck-in of less than 8 inches at a line speed greater than 1,000 feet/minute; and/or a neck-in of less than 6 inches at a line speed greater than 1,000 feet/minute; and/or a neck-in of less than 4 inches at a line speed greater than 1,000 feet/minute.

As used herein, the term 'virgin' refers to an unused material, as provided by the manufacturer.

As used herein, 'PCR' or 'post-consumer recycled' plastic refers to plastic that has been converted into a product, used by the consumer, and then recycled. The PCR used in the present disclosure is recycled LDPE, recycled LLDPE, or combinations thereof. Small amounts of recycled HDPE may also be used to improve certain properties such as stiffness.

As used herein, the term 'compounded plastic' or 'compounded polymer' or 'blended polymer' refers to a homogeneous blend containing virgin LDPE and PCR LDPE and/or LLDPE (including combinations thereof), and possibly other minor additives.

As used herein, the percentage of virgin LDPE or recycled LDPE and/or LLDPE is a weight percentage of the polymers, and excludes any minor additives such as colorants, lubricants, and the like.

As used herein, the 'melt index' ('MI') or 'melt flow index' ('MFI') refers to the measurement of the rate of extrusion of molten resins through a standard die (2.095×8 mm) according to ASTM D1238-20 (procedure B) at 190 °C and under 2.16 kg force. It is defined as the weight of polymer in grams flowing in 10 min through a standardized capillary under a standard load at a given temperature. In general, plastic with a high MI indicates a lower material viscosity, and MI is compared to compare flow characteristics of two plastics.

Plastic film thickness is commonly measured using a micrometer ASTM-D6988 or ASTM-D8136. Mil is a common unit of thickness measurement for plastic films. Thickness is also commonly represented in gauge. A simple conversion is 1 mil=100 gauge=25.4 micron.

As used herein, "OCS" or "optical control system" is a method of determining film quality whereby a high-resolution camera takes pictures of the film and identifies and quantitates gels or imperfections. The software is configured to classify the gels and report out a composite gel counts. U.S. Pat. No. 7,393,916 provides exemplary details of OCS and the composite gel count.

As used herein, a 'gel' refers to imperfections in a polymeric film. Gels are localized imperfections that are visually distinct from the surrounding film, and can be caused by uncompounded polymers, unreacted catalysts, etc.

"Downgauge" or "downgauging a plastic film" as used herein means to make a plastic film that is thinner. This is done for a number of reasons, including sustainability, reducing material cost, or based on application needs.

The use of the word "a" or "an" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. The phrase "consisting of" is closed, and excludes all additional elements. The phrase "consisting essentially of" excludes additional material elements, but allows the inclusions of non-material elements that do not substantially change the nature of the disclosure, such as instructions for use, colorants, lubricants, and the like. Any claim or claim element introduced with the open transition term "comprising," may also be narrowed to use the phrases "consisting essentially of" or "consisting of," and vice versa. However, the entirety of claim language is not repeated verbatim in the interest of brevity herein.

The following abbreviations are used herein:

| ABBREVIATION | TERM |
|---|---|
| ASTM | American Society for Testing and Materials |
| GPC | Gel permeation chromatography |
| LDPE | Low Density Polyethylene |
| LLDPE | Linear Low Density Polyethylene |
| MD | Machine direction |
| MI | Melt Index, also MFI or melt flow index |
| $M_w/M_n$ | $M_w/M_n$ is called the molar-mass dispersity index (often called polydispersity index (PDI)). $M_n$ is the number averaged MW, and $M_w$ is the weight averaged MW. The midpoint of the distribution in terms of the number of molecules is $M_w$. If all polymer chains are exactly the same, then the number-average and weight average molecular weights are exactly the same and the PDI is 1. The larger the molar-mass dispersity index, the wider is the molecular weight distribution. |
| MWD | Molecular weight distribution, see also $M_w/M_n$ |
| NMR | Nuclear magnetic resonance |

-continued

| ABBREVIATION | TERM |
|---|---|
| OCS | Optical Control System |
| PCR | Post consumer recyclate |
| PDI | polydispersity index, see also MWD and $M_w/M_n$ |
| SCB | short chain branching |
| TD | Transverse direction |

The examples herein are intended to be illustrative only, and not unduly limit the scope of the appended claims. Although the present disclosure and its advantages have been described in detail, it should be understood that various changes, substitutions and alterations can be made herein without departing from the scope of the disclosure as defined in the claims.

Heat Sealability and Peel Strength

Heat sealing is a critical process related to product packaging, particularly packaging of liquid food products. The heat sealability of one exemplary formulation of the compounded polymers described herein was tested and compared to a non-PCR containing sample of virgin LDPE (obtained from LyondellBasell).

The formulation of Sample 1 is 65 wt. % of the same virgin LDPE used in the comparative example and 35 wt. % of a PCR LDPE. For this evaluation, the compounded PCR resin was processed under the following parameters: melt temp 623 °F, 1000 fpm, achieved 0.3 mil coating weight and a neck-in of 3.75 inches total. These are common parameters for extrusion coating LDPE.

Seal temperatures of the LDPE and compounded polymer Sample 1 on a substrate were varied and the results are shown in Table 1.

Per FIG. 1A, Sample 1 had higher peel strength at all temperatures than the Comparative Example. The max peel strength of Sample 1, however, was about 2.5 lb/in at 225° F., which is less than the Comparative Example (3.6 lb/in at 230 °F). Regardless, the two samples had similar peel strength.

Prophetic Example: Film Quality

The quality of films and layers of the presently described compounded plastics will be analyzing using an optical control system (OCS). In the OCS, a high-resolution camera takes pictures of the extruded compounded plastics, and identifies and quantitates gels or imperfections. It is expected that the presently described compounded plastics, compounded with a co-rotating twin screw extruder, will have 50%, 60%, 70%, or 85% fewer gels than a similar polymer compounded with a single screw extruder; have a defect count less than 150 defects per meter$^2$ for a defect size between 500 μm and 7500 μm; a defect count less than 15 defects per meter$^2$ for a defect size between 750 μm and 1000 μm, a defect count less than 1.5 defects per meter$^2$ for a defect size between 1000 μm and 1250 μm, a defect count less than 1.5 defects per meter$^2$ for a defect size of at least 1250 μm, or a combination thereof.

The foregoing disclosure describes preferred embodiments of the present disclosure. In view of this description, various changes and modifications may be suggested to one skilled in the art. For example, additional additives may be added to the above composition to achieve additional desired characteristics for a food or non-food grade composition. Accordingly, such changes and modifications should be considered within the scope of the present disclosure.

TABLE 1

Heat Seal Data of Sample 1

| T | Comparative Example | | | | | Sample 1 | | | | |
|---|---|---|---|---|---|---|---|---|---|---|
| (° F.) | MPS | APS | STD/MPS | STD/APS | FT | MPS | APS | STD/MPS | STD/APS | FT |
| 199 | 0.29 | 0.13 | 0.22 | 0.11 | ADH | 0.505 | 0.324 | 0.15 | 0.1 | Adhesive |
| 205 | 0.7 | 0.35 | 0.46 | 0.19 | ADH | 1.355 | 0.958 | 0.35 | 0.36 | Adhesive |
| 210 | 1.4 | 0.74 | 0.62 | 0.36 | ADH | 1.686 | 1.156 | 0.12 | 0.13 | Cohesive |
| 216 | 2.1 | 1.1 | 0.16 | 0.13 | DELAM | 2.174 | 1.388 | 0.2 | 0.11 | DELAM |
| 221 | 2.4 | 0.92 | 0.34 | 0.2 | DELAM | 2.348 | 1.13 | 0.25 | 0.11 | DELAM |
| 225 | 2.4 | 0.92 | 0.34 | 0.2 | DELAM | 2.393 | 1.351 | 0.21 | 0.11 | DELAM |
| 230 | 3.7 | 0.8 | 0.26 | 0.05 | DELAM | 2.292 | 1.164 | 0.33 | 0.21 | DELAM |
| 235 | 3.4 | 0.89 | 0.43 | 0.19 | DELAM | 2.203 | 1.093 | 0.44 | 0.08 | DELAM |

DELAM = delamination
MPS = Max Peel strength, in lb/in
APS = Average Peel strength, in lb/in
FT = Type of Failure (Fiber Tear)

As shown in Table 1, Sample 1 had comparable seal strength as the virgin resin (Comparative Example) over the entire temperature range. At temperatures above 216 °F, both samples experienced delamination, which is where the seal fails at the interface between the LDPE extrusion layer the and the substrate. Thus, no changes in seal strength were observed due to the inclusion of the PCR LDPE.

Figure 1B:
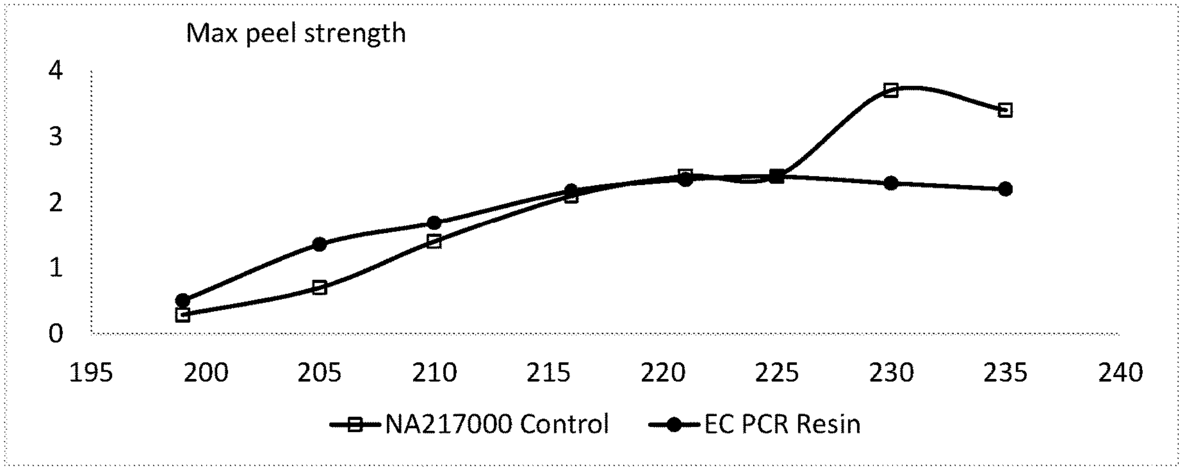

Peel strength is a measure of the adhesive strength of two or more materials that have been bonded together. The average peel strength and max peel strength of Sample 1 was compared with the Comparative Example. The results are shown in FIG. 1A and FIG. 1B.

The following references are each incorporated by reference in their entireties for all purposes. The ASTM standards cited herein are used to measure the characteristics of the claimed polymers.

ASTM D256-10 Standard Test Methods For Determining The Izod Pendulum Impact Resistance Of Plastics.

ASTM D638-14 Standard Test Method For Tensile Properties Of Plastics.

ASTM D790-17 Standard Test Methods For Flexural Properties Of Unreinforced And Reinforced Plastics And Electrical Insulating Materials.

ASTM D792-20 Standard Test Methods For Density And Specific Gravity (Relative Density) Of Plastics By Displacement.

ASTM D1238-20 Standard test method for melt flow rates of thermoplastics by extrusion plastometer.

ASTM F1249-20 Standard test method for water vapor transmission rate through plastic film and sheeting using a modulated infrared sensor.

ASTM D6980-17 Standard Test Method For Determination Of Moisture In Plastics By Loss In Weight.

ASTM D6988-21 Standard guide for determination of thickness of plastic film test specimens.

ASTM D7310-21 Standard practice for defect detection and rating of plastic films using optical sensors.

ASTM D8136 Standard test method for determining plastic film thickness and thickness variability using a non-toxic contact capacitance thickness gauge.

US2013015604 Process of Producing PCR Pellets.

U.S. Pat. No. 7,393,916 Method of reducing gels in polyolefins.

U.S. Ser. No. 10/124,527 Extrusion process for polyethylene polymers.

U.S. Ser. No. 10/138,310 Preparation of LLDPE resins and films having low gels.

Cutzwiler, G. W., et al., 'Mixed post-consumer recycled polyolefins as a property tuning material for virgin polypropylene.' J. Cleaner Production (2019) 239: 117978. doi.org/10.1016/j.jclepro.2019.117978.

McKeen, L. W., Permeability properties of plastics and elastomers, Fourth Ed. (2017).

Albareeki, M. M.; Discoll, S. B.; Barry, C. F. 'Compounding of polyethylene composites using high speed twin and quad screw extruders.' AIP Conf. Proc. 2139 (2019), 020006. doi.org/10.1063/1.5121653.

What is claimed is:

1. A polymeric film, coating or lamination layer, said film, coating or lamination layer comprising a compounded polymer, wherein said film, coating or lamination layer has 85% fewer gels than a similar polymer compounded with a single screw extruder, wherein the compounded polymer comprises:

a) 15-85 weight % of a virgin low density polyethylene (virgin LDPE) having a melt index of about 2.0-18.0 g/10 min;

b) 15-85 weight % of a post-consumer recyclate low density polyethylene, linear low density polyethylene or a combination of low and linear low density polyethylene (PCR) having a melt index of about 0.5 to about 1.5 g/10 min, and a density of about 0.915 to about 0.932 g/cm$^3$;

wherein said compounded polymer has a melt index of about 3-20 g/10 min and a density of about 0.915-0.924 g/cm$^3$, wherein melt index is measured at 190 °C under 2.16 kg force, and wherein the compounded polymer is mixed using a twin-screw compounding extruder at a temperature of 125-299 °C wherein said film, coating or lamination layer has a defect count less than 150 defects per meter$^2$ for a defect size between 500 μm and 7500 μm.

2. The film, coating or lamination layer of claim 1, wherein said film, coating or lamination layer has a defect count less than 15 defects per meter$^2$ for a defect size between 750 μm and 1000 μm.

3. The film, coating or lamination layer of claim 1, wherein said film, coating or lamination layer has a defect count less than 1.5 defects per meter$^2$ for a defect size between 1000 μm and 1250 μm.

4. The film, coating or lamination layer in claim 1, wherein said film, coating or lamination layer has a defect count less than 1.5 defects per meter$^2$ for a defect size of at least 1250 μm.

5. A film, coating or lamination layer comprising one or more layers of the polymeric film of claim 1 with a film or coating thickness less than 10 pounds of polymer/ream at a line speed greater than 1,000 feet/minute wherein the compounded polymer comprises:

a) 15-85 weight % of a virgin low density polyethylene (virgin LDPE) having a melt index of about 2.0-18.0 g/10 min;

b) 15-85 weight % of a post-consumer recyclate low density polyethylene, linear low density polyethylene or a combination of low and linear low density polyethylene (PCR) having a melt index of about 0.5 to about 1.5 g/10 min, and a density of about 0.915 to about 0.932 g/cm$^3$;

wherein said compounded polymer has a melt index of about 3-20 g/10 min and a density of about 0.915-0.924 g/cm$^3$, wherein melt index is measured at 190 °C under 2.16 kg force, and wherein the compounded polymer is mixed using a twin-screw compounding extruder at a temperature of 125-299 °C, wherein said film, coating or lamination layer has a defect count less than 150 defects per meter$^2$ for a defect size between 500 μm and 7500 μm.

6. The film, coating or lamination layer of claim 5, wherein the draw down is less than 8 pounds/ream at a line speed greater than 1,000 feet/minute.

7. The film, coating or lamination layer of claim 5, wherein said film, coating or lamination layer has a defect count less than 1.5 defects per meter$^2$ for a defect size between 1000 μm and 1250 μm.

8. A film, coating or lamination layer comprising one or more layers of the polymeric film of claim 1 with a film or coating neck-in of less than 8 inches at a line speed greater than 1,000 feet/minute wherein the compounded polymer comprises:

a) 15-85 weight % of a virgin low density polyethylene (virgin LDPE) having a melt index of about 2.0-18.0 g/10 min;

b) 15-85 weight % of a post-consumer recyclate low density polyethylene, linear low density polyethylene or a combination of low and linear low density polyethylene (PCR) having a melt index of about 0.5 to about 1.5 g/10 min, and a density of about 0.915 to about 0.932 g/cm$^3$;

wherein said compounded polymer has a melt index of about 3-20 g/10 min and a density of about 0.915-0.924 g/cm$^3$, wherein melt index is measured at 190 °C under 2.16 kg force, and wherein the compounded polymer is mixed using a twin-screw compounding extruder at a temperature of 125-299 °C, wherein said film, coating or lamination layer has a defect count less than 150 defects per meter$^2$ for a defect size between 500 μm and 7500 μm.

9. The film, coating or lamination layer of claim 8, wherein the neck-in of less than 6 inches at a line speed greater than 1,000 feet/minute.

10. The film, coating or lamination layer of claim 8, wherein the neck-in of less than 4 inches at a line speed greater than 1,000 feet/minute.

11. The film, coating or lamination layer of claim 8, wherein said film, coating or lamination layer has a defect count less than 1.5 defects per meter$^2$ for a defect size between 1000 μm and 1250 μm.

* * * * *